United States Patent [19]

Morner

[11] Patent Number: 4,697,826
[45] Date of Patent: Oct. 6, 1987

[54] LOCKING DEVICE FOR A BAND IN A SAFETY BELT OF A PASSIVE VEHICLE SAFETY BELT SYSTEM

[75] Inventor: Bengt O. J. S. Morner, Hovas, Sweden

[73] Assignee: Autoliv Development Aktiebolag, Vargarda, Sweden

[21] Appl. No.: 789,967

[22] PCT Filed: Jan. 17, 1985

[86] PCT No.: PCT/SE85/00016
§ 371 Date: Oct. 9, 1985
§ 102(e) Date: Oct. 9, 1985

[87] PCT Pub. No.: WO85/03262
PCT Pub. Date: Aug. 1, 1985

[30] Foreign Application Priority Data

Jan. 17, 1984 [SE] Sweden .................. 8400199.9

[51] Int. Cl.$^4$ ........................... B60R 21/00
[52] U.S. Cl. ................................. 280/804
[58] Field of Search .............. 280/802, 804; 297/469

[56] References Cited

U.S. PATENT DOCUMENTS

| | | | |
|---|---|---|---|
| 3,830,518 | 8/1974 | Silber | 280/804 |
| 4,070,040 | 1/1978 | Igeta | 280/804 |
| 4,256,331 | 3/1981 | Schwanz et al. | 280/804 |
| 4,345,781 | 8/1982 | Suzuki et al. | 280/804 |
| 4,354,696 | 10/1982 | Volk et al. | 280/804 |
| 4,521,034 | 6/1985 | Takada | 280/804 |

FOREIGN PATENT DOCUMENTS 2440990  8/1974  Fed. Rep. of Germany .

Primary Examiner—John J. Love
Assistant Examiner—Ross Weaver
Attorney, Agent, or Firm—Spencer & Frank

[57] ABSTRACT

A locking device for a band in a safety belt of a passive vehicle safety belt system comprises at least one fastening means (10) for the band (11) and a lock casing (15) into which the fastening means can be inserted and retained. The fastening means is adapted to be moved along a guide rail (13) by a traction means (16), controlled by an electric motor, and is adapted to be released from the traction means, when it engages with the lock casing, so that the traction means and the motor are not exposed to shock loads, when the fastening means engages with the lock casing. The traction means can continue its movement, when the power supply to the motor has been interrupted, so that the kinetic energy accumulated in the motor and the traction means can decay gradually. A slider (19) is attached to the traction means (16), and the fastening means (10) is releasably attached to the slider and is retained to the slider by means of pins (25.31) and a pawl (36). The pawl is adapted to be released from the slider, when the fastening means is moved into the lock casing.

11 Claims, 6 Drawing Figures

LOCKING DEVICE FOR A BAND IN A SAFETY BELT OF A PASSIVE VEHICLE SAFETY BELT SYSTEM

BACKGROUND OF THE INVENTION

1. Technical Field

The present invention is related to a locking device for a band in a safety belt of a passive vehicle safety belt system. A passive vehicle safety belt system comprises a movable fastening means for the band in the safety belt; a guide rail for the movable fastening means attached to the car body; a power transmission means attached to the fastening means for moving the fastening means; and reversible motor means for driving the power transmission means for moving the fastening means backward and forward between a neutral position and a locking position on the guide rail. The locking device comprises a lock casing attached to the car body adjacent the guide rail at the locking position of the fastening means for keeping the fastening means. The purpose of a passive vehicle safety belt system is to automatically secure a person, e.g. the driver, who takes a seat in the car, before the car is started.

2. Background Art

Passive vehicle safety belt systems of the type set forth above are previously known, for example through U.S. Nos. 3,830,518, 4,256,331, 4,345,781 and 4,354,696.

An essential problem in the design of passive systems is the braking of the driving motor, normally an electric motor, used for moving the fastening means between the neutral position and the locking position, when the fastening means is moved into the lock casing and stopped in the casing. The fastening means is stopped very abruptly in the lock casing by striking a stop surface, and this causes a heavy shock load on the power transmission means and the reversible motor means due to the kinetic energy accumulated in the reversible motor means. This shock load can cause damage to the reversible motor means and the power transmission means leading to functional disorder and need of repair, and thus reducing the reliability of the system.

SUMMARY OF THE INVENTION

The main object of the invention is to provide a passive vehicle safety seat belt system in which the locking of the fastening means in the lock casing can occur without exposing the reversible motor means and the power transmission means to any shock loads, so that the reliability is improved. According to the invention, the above object is basically obtained in that in a passive vehicle safety seat belt system of the type including a safety belt having at least one band, at least one movable fastening means for the band, a guide rail attached to a vehicle body for guiding each movable fastening means, a power transmission means for moving each movable fastening means along the guide rail, reversible motor means for driving the power transmission means for moving each fastening means forward and backward between a common neutral position and a respective locking position, and a respective lock casing for each fastening means which is attached to the vehicle body adjacent the guide rail at the respective locking position of the respective fastening means and into which the respective fastening means can be inserted and kept; each fastening means is adapted to be released from the power transmission means when inserted into its respective lock casing, and the power transmission means can continue its movement after the release of the last fastening means and the interruption of the power supply to the motor means, so that the kinetic energy accumulated in the reversible motor means can decay gradually during the continued movement of the power transmission means.

By the disconnection of the fastening means from the power transmission means when the fastening means is moved into the lock casing, the power transmission means can move on a bit, until the movement of the reversible motor means has decayed. The electric driving motor can then easily be stopped by means of a microswitch that is positioned in the lock casing and actuated by the fastening means when the fastening means is moved into the lock casing. The kinetic energy accumulated in the reversible motor means including possible gear changing devices, for example worm gear units, can then decay successively during the continuing movement of the power transmssion means in its previous path of motion. This will completely avoid any form of shock load on the motor means.

BRIEF DESCRIPTION OF THE DRAWINGS

One embodiment of the locking device according to the invention will now be further described below with reference to the accompanying drawings.

DETAILED DESCRIPTION OF THE PREFERRED EMBODIMENTS

Figure 1:
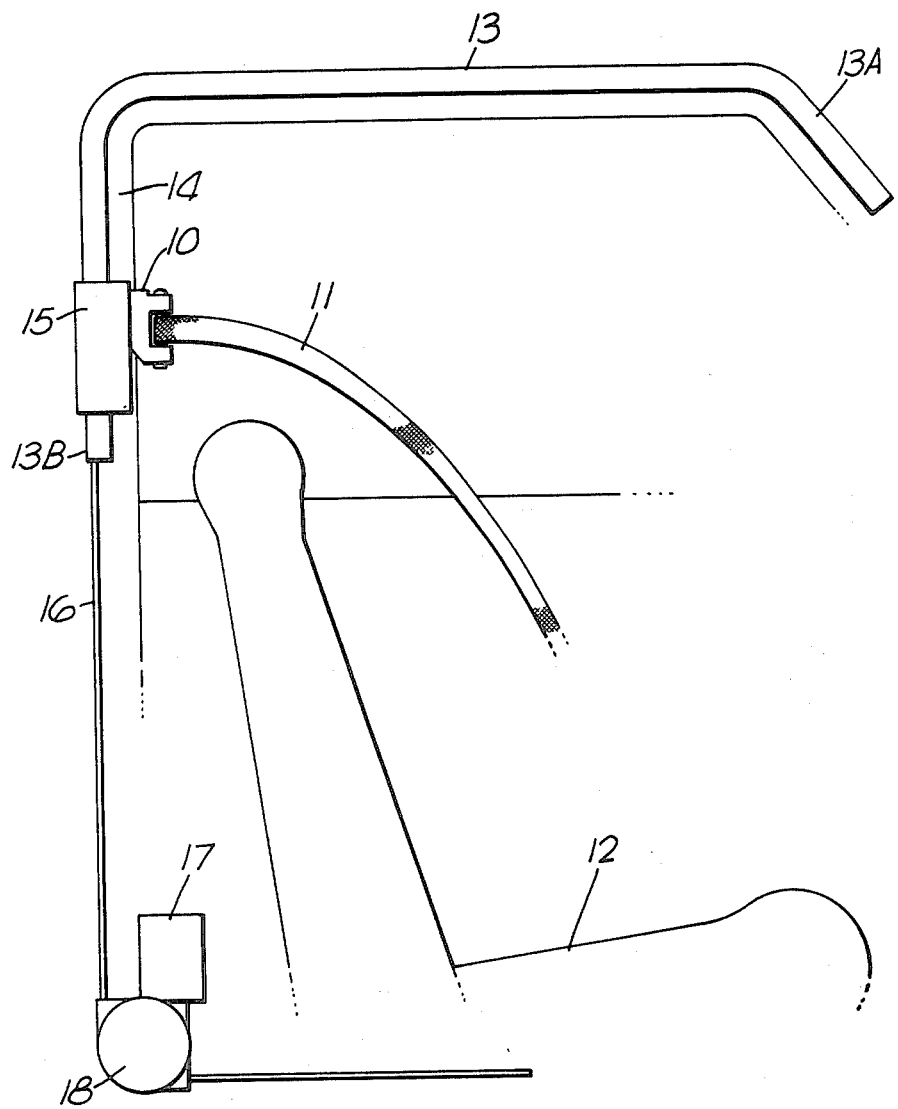
FIG. 1 is a schematic view of a passive vehicle safety belt system according to the invention having a movable fastening means for the band of the safety belt; a guide rail for the fastening means with a lock casing for the fastening means; and driving means for the fastening means.

The passive safety belt system shown in FIG. 1 comprises a movable fastening means 10 for a band 11 in a safety belt intended to be applied on a person sitting in the seat or chair 12 in the car. Apart from the shown band 11, the safety belt comprises a support having a rotatable shaft for coiling the portion of the band not used. This support is positioned on the car floor adjacent to the chair 12 and is attached to the car body. The support is provided with a band or vehicle sensitive locking device for automatical locking of the shaft. The support and the locking device can be of any type and have not been shown on the drawing for that reason. The fastening means 10 is movable along a guide rail 13 running substantially from the front pillar, the so called A-pillar, of the car body substantially horizontally backward to the rear pillar 14, the so called B-pillar, where it turns about 90° and runs downwards along the B-pillar 14 to a position just above the head portion of the chair 12. At this position, a lock casing 15 is provided to hold the fastening means 10. The lock casing 15 surrounds the guide rail 13 and is rigidly attached to the pillar 14. The locking means 10 and the lock casing 15 will be described in more detail below with reference to FIGS. 2–6.

Figure 6:
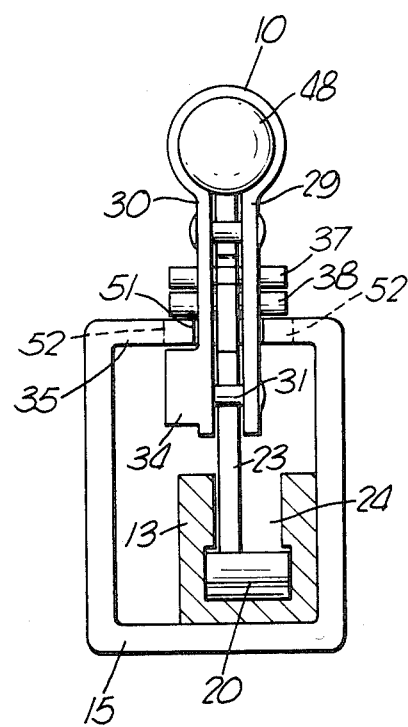
FIG. 6 is an end view of the lock casing with the fastening means inserted.

The fastening means 10 is attached to a power transmission means, designed as a punched ribbon 16 of well known type. The ribbon 16 is driven by a reversible electric motor 17 over a cog wheel 18 for moving the fastening means 10 along the guide rail 13 between its end points 13A and 13B. The punched ribbon 16 runs in a guard rail, not shown, and can pull the fastening means from the end 13A to the end 13B of the guide rail and then push the fastening means back to the end 13A. The guide rail 13 has a substantially U-shaped cross section having leg flanges extending towards each other, so that the guide rail has a substantially T-shaped channel, as shown in FIG. 6. The guide rail preferably consists of an aluminium section.

Figure 2:
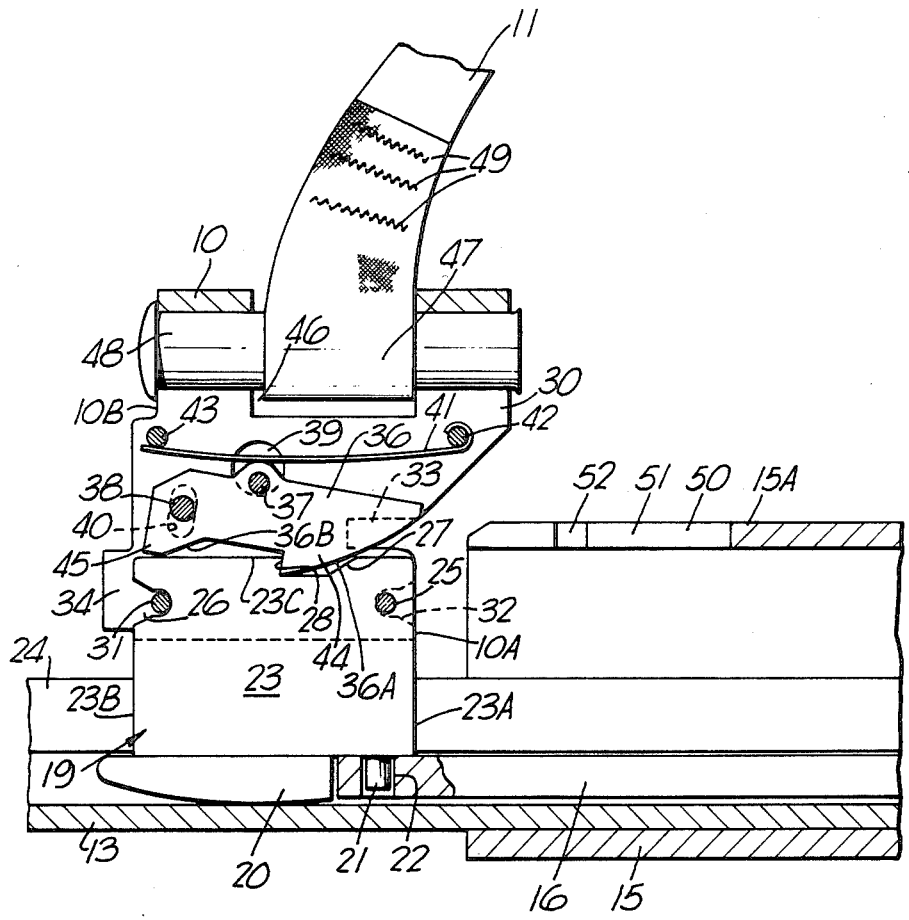
FIGS. 2–5 are longitudinal cross sections, in a larger scale, through the movable fastening means and its lock casing during the insertion of the fastening means in the lock casing.

The fastening means 10 is attached to the punched ribbon 16 by means of a slider 19, as shown in FIG. 2. The slider 19 is designed with a guide portion 20 that is shaped like the T-channel of the guide rail 13 and is moveable in the guide rail 13 in its longitudinal direction. The guide portion 20 is provided with a pin or projection 21 for engagement in a hole 22 in the punched ribbon 16, so that the slider 19 is moved when the punched ribbon 16 is moved in the guide rail 13, and with a connection portion 23 projecting through a longitudinal slot 24 of the guide rail 13. The connection portion 23, shown in FIG. 2 in front of the lock casing 15, is designed as a thin plate and is provided with a coupling pin 25, projecting on either side of the connection portion, at the edge 23A facing the lock casing 15. The connection portion 23 is provided with a recess 26 in the edge 23B turned or facing away from the lock casing 15. Furthermore, the connection portion 23 is provided with a recess 27 in the edge 23C turned away from the guide rail 13. The recess 27 has a wall 28 forming a somewhat acute angle with the edge 23C.

The fastening means 10 is designed as a loop having two parallel legs 29,30, as more clearly shown in FIG. 6, and is adapted to be connected to the connection portion 23 of the slider 19. For this purpose, the fastening means at the edge 10B which is turned away from the lock casing 15 is provided with a projecting coupling pin 31 running between the legs 29,30 of the loop and adapted to engage with the recess 26 in the connection portion 23. The legs 29,30 of the loop, in their edges facing the lock casing 15, are provided with respective recesses 32 adapted to engage with the coupling pin 25 of the connection portion 23, and with respective slots 33 adapted to engage with a stationary edge 15A of the lock casing 15, when the fastening means 10 is in its locking position. Furthermore, the edge 10B of the fastening means 10 is provided with a bent tap 34 adapted to engage with a wall 35 of the lock casing 15, so that the fastening means in the locking position is held at both edges 10A,10B in the lock casing 15.

The fastening means 10 is further provided with a pawl 36 movably mounted between the legs 29,30 of the fastening means substantially in the same plane as the plate-shaped connection portion 23 of the slider 19. The pawl 36 is mounted by means of two projecting pivot pins 37,38. The first pivot 37 is adapted to engage with respective recesses 39 in the legs 29,30 of the fastening means 10, with the areas of the recesses 39 being substantially larger than the cross section area of the pivot pin 37, so that the pivot pin 37 can be moved in the recesses 39. The second pivot pin 38 is adapted to engage with respective slots 40 in the legs 29,30. The slots 40 run substantially perpendicularly to the guide rail 13 and have a width corresponding to the thickness of the pivot pin 38 projecting into the slots, so that the pivot pin can be guided in the slots. Due to the shape of the recesses 39 and the slots 40, the pawl 36 can be moved between the legs 29,30 towards and away from the surface 23C of the connection portion 23 of the slider. The pawl 36 is loaded by a leaf spring 41, attached between two pins 42,43, towards the connection portion 23 of the slider 19, so that the pawl 36 normally abuts the connection portion 23. The pawl 36 is provided with a projecting tooth 44, adapted to engage with the recess 27 of the connection portion 23, and with a projecting rear portion 45. Furthermore, the pawl 36 has inclined guide surfaces 36A,36B facing the guide rail 13. The operation of the guide surfaces will be described below.

The loop forming the fastening means 10 is provided with a recess 46 in its base portion. An eye 47 of the band 11 penetrates into the loop and is kept in the loop by means of a shaft 48 attached to the loop and passing through the eye. The eye 45 is made by folding the end of the band and attaching the end to the band by means of seams 49.

The lock casing 15 is provided with a slot-shaped recess 50 at the end facing the fastening means 10. The recess 50 is terminated by the crossing edge 15A and is for the rest limited by longitudinal edges 51 having indentations 52 for engagement with the ends of the pivot 38 of the pawl 36, as will be further explained below. The recess 50 has a width so that the fastening means 10 can be moved into the recess, until the fastening means engages with the edge 15A. The lock casing 15 has a height so that the slider 19 can be moved through the lock casing after having been released from the fastening means 10.

The operation of the locking device described with reference particularly to FIGS. 2 and 6 will now be explained with reference to FIGS. 1-5.

Figure 3:
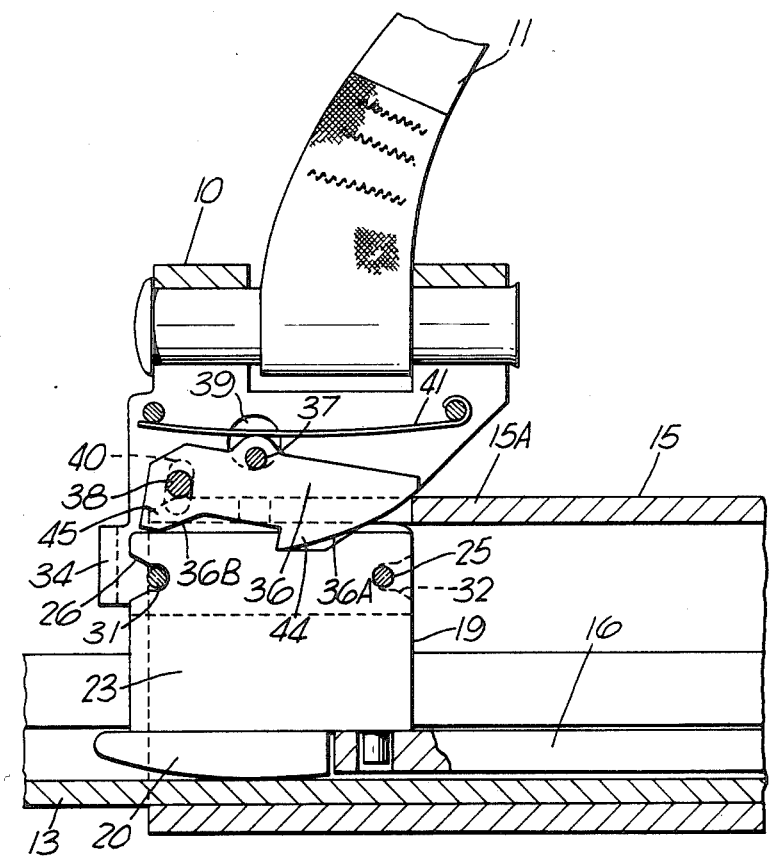
Figure 4:
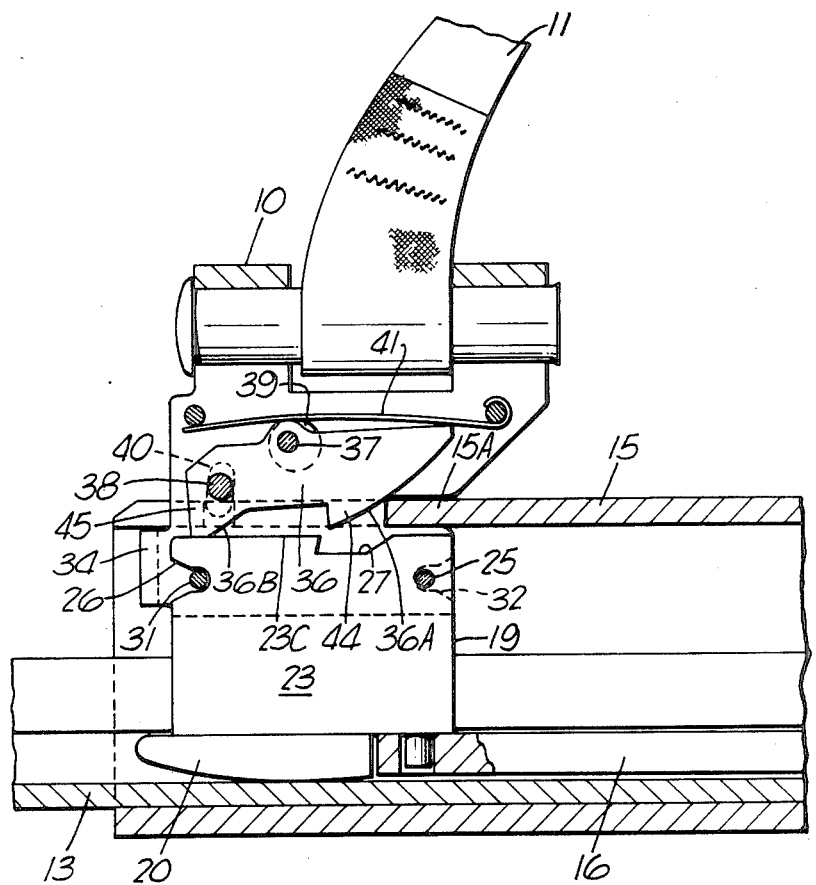
Figure 5:
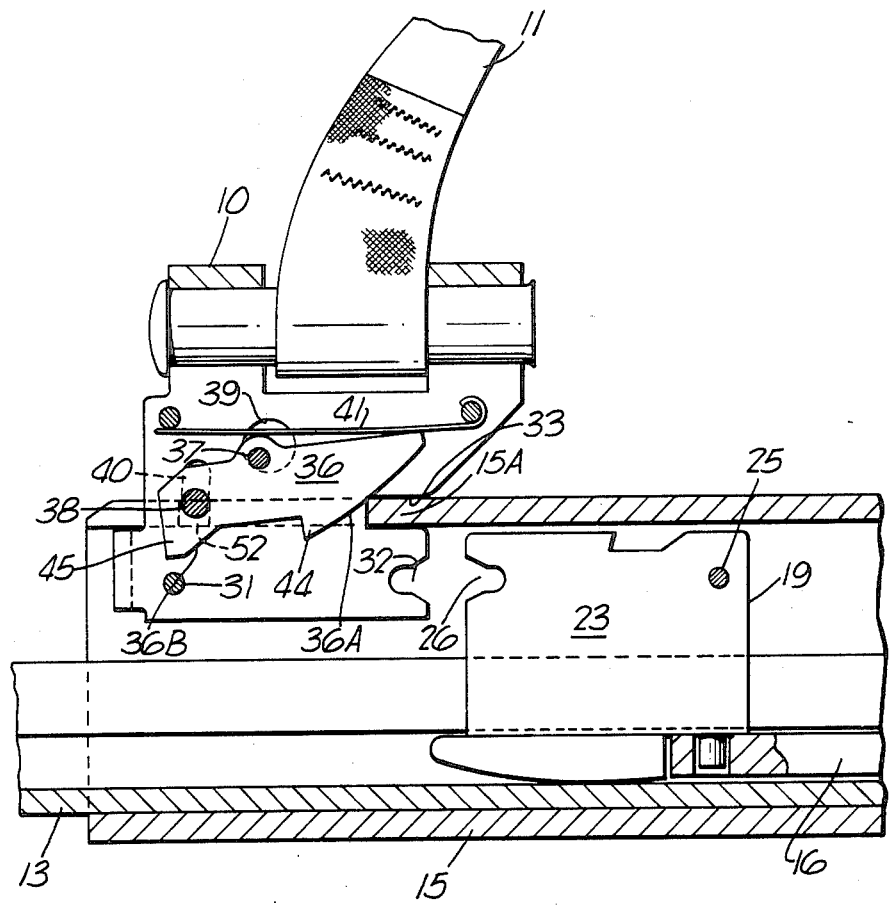

In FIG. 2 the fastening means 10 and the slider 19 are shown outside the lock casing 15. If the punched ribbon 16 is moved to the left in FIG. 2, the slider 19 will be moved towards the neutral position for the fastening means 10. The slider 19 drives the fastening means 10 by means of its coupling pin 25 and recess 26 cooperating with the recess 32 and the coupling pin 31, respectively, of the fastening means 10. If the punched ribbon 16 is moved to the right in FIG. 2, the slider 19 will be moved into the lock casing 15. The pawl 36 of the fastening means 10 engages with the recess 27 of the slider 19 and drives the fastening means 10. During these movements of the slider 19, the fastening means 10 is kept on the slider 19 by means of the coupling pins 25,31 engaging with the recesses 32 and 26, respectively. When the slider 19 is pulled into the lock casing 15, the fastening means 10 will be moved into the recess 50. The pawl 36 will then abut the edge 15A of the lock casing with its guide surface 36A, as shown in FIG. 3. When the slider 19 and the fastening means 10 are further pulled into the lock casing 15, the pawl 36 will be lifted, with the pivot pin 37 of the pawl 36 being moved in the recesses 39 in the fastening means 10 and the rear portion 45 of the pawl 36 being forced to abut the edge 23C of the connection portion of the slider 19, as shown in FIG. 4. Thus, the slider 19 is released from the fastening means 10 and can continue its movement through the lock casing 15. When the slider 19 has been pulled away, the rear portion 45 of the pawl 36 will fall down behind the slider. The pivot 38 of the pawl 36 is then moved in the slot 40 in the fastening means 10 and is moved into the recesses 52 in the lock casing 15 by the action of the spring 41, as shown in FIG. 5. This will prevent unintentional withdrawal of the fastening means 10 from the lock casing 15. The fastening means 10 is now kept in the lock casing 15 by the edge 15A of the lock casing 15 engaging with the slot 33 of the fastening means 10, as shown in FIGS. 4 and 5, and by the tap 34 of the fastening means 10 engaging under a wall 35 of the lock casing 15, as shown in FIG. 6. Thus, the lock casing 15 will take up the possible stresses appearing in the band 11 of the safety belt. When the slider 19 is moved in the opposite direction, the slider 19 will first abut against the guide surface 36B of the rear portion 45 of the pawl 36. The rear portion 45 of the pawl 36 is then lifted, so that the ends of the pivot pin 38 will be moved out of the recesses 52 in the lock casing 15 and the fastening means 10 can be moved out of the lock casing 15 by the slider 19. The pawl 36 will then again engage with the recess 27 in the slider.

The fastening means 10 preferably is provided with means for manual the lifting of the pawl 36, so that the fastening means 10 can be released from the slider 19, in case the automatic movement of the slider 19 is out of order for one reason or another. The fastening means 10 can then be released from the slider 19 and manually inserted into the lock casing 15, so that the safety belt can be used, or manually withdrawn from the lock casing so that a person embraced by the safety belt can be released.

The locking device according to the invention has been described above in connection with a passive system of two-point-type. However, the locking device can as well be used in passive systems of three-point-type, for example in systems having two movable fastening means of the type shown in the U.S. Pat. No. 3,830,518 mentioned in the introductory portion. According to the invention, in such systems both fastening means must be released from the power transmission means, when they have been moved into their respective lock casings. The power transmission means must also after the insertion of the last fastening means in its lock casing continue its movement, so that the kinetic energy accumulated in the reversible motor means can decay gradually during the continued movement of the power transmission means, when the power supply to the driving motor has been interrupted. In such systems one fastening means can be driven and guided by the other fastening means. Thus, one fastening means is connected to the power transmission means over the other fastening means.

While only one embodiment of the locking device according to the invention has been described and shown, it is evident that many variations and modifications are possible within the scope of the invention. The slider and the fastening means can for example be designed in many different ways, and the coupling between these means can also be modified in many ways. For example, it is not necessary that the slider is completely released from the fastening means. In many cases, it may be sufficient that the slider can be displaced slightly in relation to the fastening means, when this has been placed in its locking position. This can be accomplished by making the projections providing the coupling on the fastening means and the slider, respectively, engage with elongated slots in the opposite means, so that a certain relative movement can occur. This may be an advantage, when it is not desirable to make the fastening means disconnectable, e.g. to ensure that the safety belt is used in a proper way.

I claim:

1. In a passive vehicle safety seat belt system including: a safety belt having at least one band; at least one movable fastening means for the band; a guide rail attached to a vehicle body for guiding each said movable fastening means; a power transmission means for moving each said movable fastening means along said guide rail; reversible motor means for driving the power transmission means for moving each fastening means forward and backward between a neutral position and a respective locking position; and a respective lock casing for each said fastening means which is attached to the vehicle body adjacent the guide rail at the respective locking position of the respective said fastening means and into which the respective said fstening means can be inserted and kept; the improvement wherein: each said fastening means is adapted to be released from said power transmission means when inserted into its respective said lock casing, and said power transmission means can continue its movement after release of the last fastening means and interruption of the power supply to said motor means, so that the kinetic energy accumulated in said reversible motor means can decay gradually during the continued movement of said power transmission means.

2. Apparatus according to claim 1, wherein said power transmission means includes a slider adapted to be moved in said guide rail; and means for releasably connecting each said fastening means to said slider.

3. Apparatus according to claim 2, wherein: said slider has a connection portion projecting from the gruide rail through a longitudinal slot in said rail; and said means for releasably connecting attaches said at least one fastening means to said connection portion so as to move said fastening means along the guide rail at the outside of said rail.

4. Apparatus according to claim 3, wherein said means for releasably connecting said fastening means to said connection portion of said slider includes: two projections, one of which is provided on the connection portion of the slider and is adapted to engage with a recess in the edge of the fastening means facing the lock casing when the fastening means is moved towards the lock casing, and the other of which is provided on the fastening means and is adapted to engage with a recess in the edge of the connection portion of the slider turned away from the lock casing when the slider is moved towards the lock casing, so that the slider and the fastening means can be brought into and out of engagement with each other by relative movement in the longitudinal direction of the guide rail and so that the slider, when moved towards the neutral position of the fastening means, drives the fastening means and, when moved away from the neutral position of the fastening means, may be released from the fastening means; and a movable pawl means for connecting the fastening means to the connection portion of the slider when the slider is moved away from the neutral position of the fastening means, and for releasing the fastening means from the connection portion of the slider when the fastening means has been inserted into the lock casing.

5. Apparatus according to claim 4, wherein said pawl means includes a pawl movably mounted on the fastening means in the same plane as the connection portion of the slider, and said pawl is provided with a projecting tooth adapted to engage with a recess in the connection portion of the slider to connect the fastening means to the connection portion of the slider during the movement of the slider towards the lock casing, and with a projection adapted to engage with a stationary portion of the lock casing to prevent withdrawal of the fastening means from the lock casing when the connection portion of the slider has been released from the fastening means.

6. Apparatus according to claim 5, wherein: said projection is a first laterally projecting pivot pin; the pawl is provided with a second laterally projecting pivot pin; and the fastening means is provided with first and second recesses in which the respective first and second pivot pins of the pawl engage, with the second recess having an area substantially larger than the cross sectional area of the second pivot pin penetrating this recess, so that the second pivot pin can be moved in the second recess, and with the first recess forming a slot running substantially perpendicularly to the guide rail and having a width corresponding to the thickness of the first pivot pin penetrating this recess, so that the first pivot pin is guided in the slot during movement of the pawl.

7. Apparatus according to claim 6, wherein the fastening means is provided with a spring adapted to force the pawl in a direction towards the guide rail.

8. Apparatus according to claim 7, wherein the fastening means is provided with a third recess in its edge facing the lock casing when the fastening means is moved into the lock casing, with this third recess being adapted to cooperate with a stationary portion of the lock casing, so that the fastening means is held at the lock casing at this edge; and the fastening means, at its opposite edge, is provided with a further projection adapted to be moved into the lock casing and retained by a rigid portion of the lock casing, so that the fastening means is held in the lock casing also at this opposite edge.

9. Apparatus according to claim 8, wherein the lock casing is provided with a control surface for the pawl, positioned so that, when the fastening means is moved into the lock casing, the pawl is moved away and releases the connection portion of the slider so that the slider may be pulled away from the fastening means by the power transmission means, and is provided with a recess positioned so that the first pivot pin positioned in the slot-shaped first recess in the fastening means is moved into this recess, to retain the fastening means in the lock casing, when the slider has been released from the fastening means.

10. Apparatus according to claim 1, wherein each said fastening means and its respective lock casing are so designed that each said fastening means can be inserted manually into its respective said lock casing to be retained in the casing.

11. In a passive vehicle safety seat belt system including a safety seat belt, movable fastening means connected to one end of said seat belt, a guide rail attached to a vehicle body for guiding said movable fastening means, a power transmission means for moving said movable fastening means along said guide rail; reversible motor means for driving said power transmission means for moving said fastening means forward and backward between a neutral position and a locking position, a lock casing for said fastening means attached to the vehicle body adjacent said guide rail at said locking position for said fastening means and into which said fastening means can be inserted and kept, and means, responsive to said fastening means being moved into said lock casing, for interrupting the supply of power to said motor means; the improvement comprising: means for releasably connecting said fastening means to said power transmission means; and means, disposed in said lock casing, for causing said means for releasably connecting to release the connection between said fastening means and said power transmission means when said fastening means is moved into said lock casing, whereby said power transmssion means can continue its movement after the release of said fastening means and the interruption of the power supply to said motor means so that kinetic energy accumulated in said reversible motor means can decay gradually during the continued movement of said power transmission means.

* * * * *